June 26, 1928.　　　　　　　　　　　　　　1,674,789
D. H. NEEDHAM ET AL
LAUNDER
Filed July 7, 1926
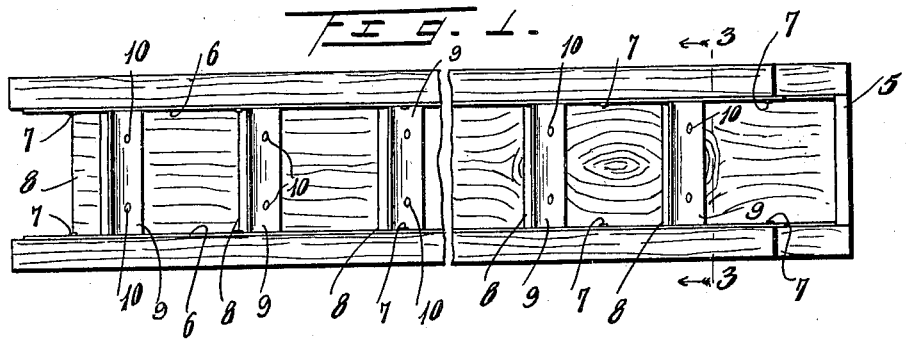
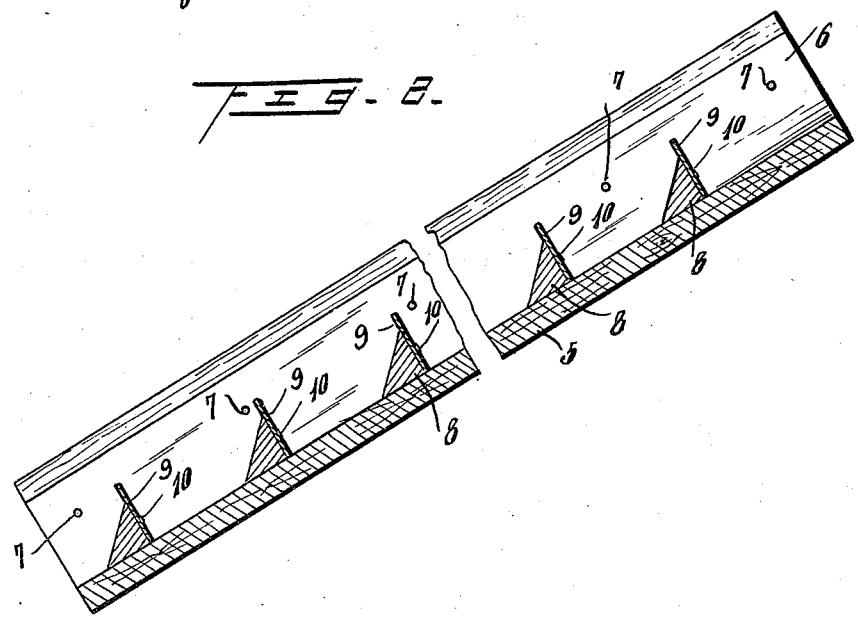
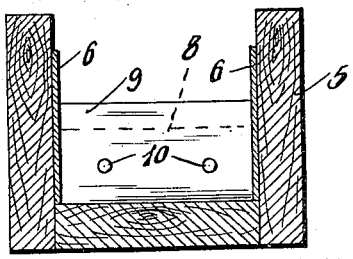
Inventor
Dawson H. Needham, Paul Pearson+
William H. Dawson
By Featherstonhaugh & Co
Attorney Patented June 26, 1928.

1,674,789

UNITED STATES PATENT OFFICE.

DAWSON HENRY NEEDHAM, PAUL PEARSON, AND WILLIAM HENRY DAWSON, OF ANACONDA, MONTANA.

LAUNDER.

Application filed July 7, 1926. Serial No. 121,013.

This invention relates to launders and has for its object a novel and inexpensive baffle construction adapted more particularly to launders of the type used in connection with smelter concentrators but also capable of wider application.

It has heretofore been the practice, in providing a launder for smelting concentrators, to construct a wooden trough having the sides lined with iron or steel and to baffle the flow of material through the trough by placing new castings, rubber, or glass on the bottom of the trough. This practice is far from economical due to the fact that the castings and other materials heretofore used for baffling purposes as above described are quite expensive and require replacement after a comparatively brief period of use.

In the present invention the foregoing objection is overcome by use of wooden cleats fastened to extend transversely across the unlined bottom of the trough and having the sides, opposing the direction of flow through the trough, faced with thin and comparatively inexpensive metal plates. Actual practice has demonstrated that baffles constructed in this manner will continue to operate successfully for a much longer period than the castings heretofore employed for the same purpose.

Other purposes and advantages of the invention will become apparent from the following detailed description taken in connection with the accompanying drawings in which, Figure 1 is a top plan view of a launder constructed in accordance with our invention, Figure 2 is a longitudinal sectional view through the launder, and, Figure 3 is a transverse sectional view taken along the line 3—3 of Figure 1.

Referring now to specific details of construction, 5 designates a trough composed of wood and having its sides lined with suitable metal plates 6 held in place by nails 7 or other suitable fastening means. Extending transversely across the unlined bottom of the trough are a plurality of spaced wooden cleats 8 which may be of any desired shape and nailed or otherwise secured to the bottom of the trough. That side of each cleat which opposes the direction of flow through the trough is covered by a comparatively thin metal facing plate 9 made of sufficient height to project an appreciable distance upwardly beyond the cleat. Each facing plate 9 is drilled to provide suitable holes through which nails or other fastening means 10 are passed to secure the plate to its respective cleat.

The foregoing structure provides an efficient and comparatively inexpensive launder particularly adapted for use in connection with smelter concentrators. Actual practice has demonstrated that the baffles afforded by the metal faced cleats will last much longer than the castings heretofore employed for the same purpose and are replaceable at a fraction of the cost of such castings. Another feature of importance resides in the fact that when using baffles constructed according to the present invention it is not necessary that the bottom of the trough be lined with rubber or glass as heretofore required in connection with the use of the castings previously referred to.

Having thus fully described what we now conceive to be the preferred embodiment of our invention it will be understood that various desired modifications may be resorted to within the scope and spirit of the appended claims.

What we claim is:

1. A launder comprising a trough having the bottom and sides composed of wood, metal plates lining said sides, wooden cleats fastened to and extending transversely across said bottom and a metal facing plate secured to and covering each cleat at the side opposing the direction of flow through said trough, said cleats being spaced an appreciable distance apart to provide intervening pockets in which the ore accumulates and serves as a protective lining for the underlying portion of the trough.

2. A launder comprising a trough having the bottom composed of wood, wooden cleats fastened to and extending transversely across said bottom and a metal facing plate secured to and covering that side of each cleat which opposes the direction of flow through the trough, said cleats being spaced an appreciable distance apart to provide intervening pockets, the bottom walls of which are protected by the accumulaton of ore thereon.

3. A launder as recited in claim 2 in which said metal plates are made of sufficient height to project upwardly above said cleats.

In testimony whereof we hereunto affix our signatures.

DAWSON HENRY NEEDHAM.
PAUL PEARSON.
WILLIAM HENRY DAWSON.